United States Patent [19]

Nafziger

[11] 4,045,522

[45] Aug. 30, 1977

[54] ANIMAL WASTE TREATMENT SYSTEM

[76] Inventor: Joel L. Nafziger, R.R. 1, Hopedale, Ill. 61747

[21] Appl. No.: 621,392

[22] Filed: Oct. 10, 1975

Related U.S. Application Data

[62] Division of Ser. No. 430,475, Jan. 3, 1974, Pat. No. 3,927,644.

[51] Int. Cl.² .......................... F04F 5/02; F04B 23/02
[52] U.S. Cl. ..................................... 261/93; 210/220; 417/89; 417/158
[58] Field of Search .................. 261/29, 93; 210/220, 210/221 R; 209/169, 170; 416/145; 417/89, 158

[56] References Cited

U.S. PATENT DOCUMENTS

| | | | |
|---|---|---|---|
| 1,312,754 | 8/1919 | Rowand | 261/93 |
| 1,374,446 | 4/1921 | Greenawalt | 209/169 |
| 1,526,596 | 2/1925 | Greenawalt | 261/87 |
| 2,244,902 | 6/1941 | Stich | 261/93 |
| 2,293,183 | 8/1942 | Walker | 261/93 |
| 2,628,827 | 2/1953 | Daman | 209/169 |
| 3,092,678 | 6/1963 | Braun | 261/87 |
| 3,393,802 | 7/1968 | Logue et al. | 209/169 |
| 3,400,918 | 9/1968 | MacLaren | 261/87 |
| 3,650,950 | 3/1972 | White | 261/93 |

*Primary Examiner*—Bernard Nozick
*Assistant Examiner*—Gregory N. Clements
*Attorney, Agent, or Firm*—Fraser and Bogucki

[57] ABSTRACT

Provided is a combined aerating and agitating pump having an adjustable air vent for establishing an optimum level of aeration of a slurry in a farm animal waste treatment system to minimize the formation of foam while at the same time establishing proper conditions for the growth of bacterial which consumes the waste. The adjustable pump aerator and agitator in combination with a trap of the farm animal waste treatment system cooperate in the present invention to continuously separate sludge from the slurry and substantially eliminate foam buildup within an animal maintenance house in the farm animal waste treatment system.

5 Claims, 5 Drawing Figures

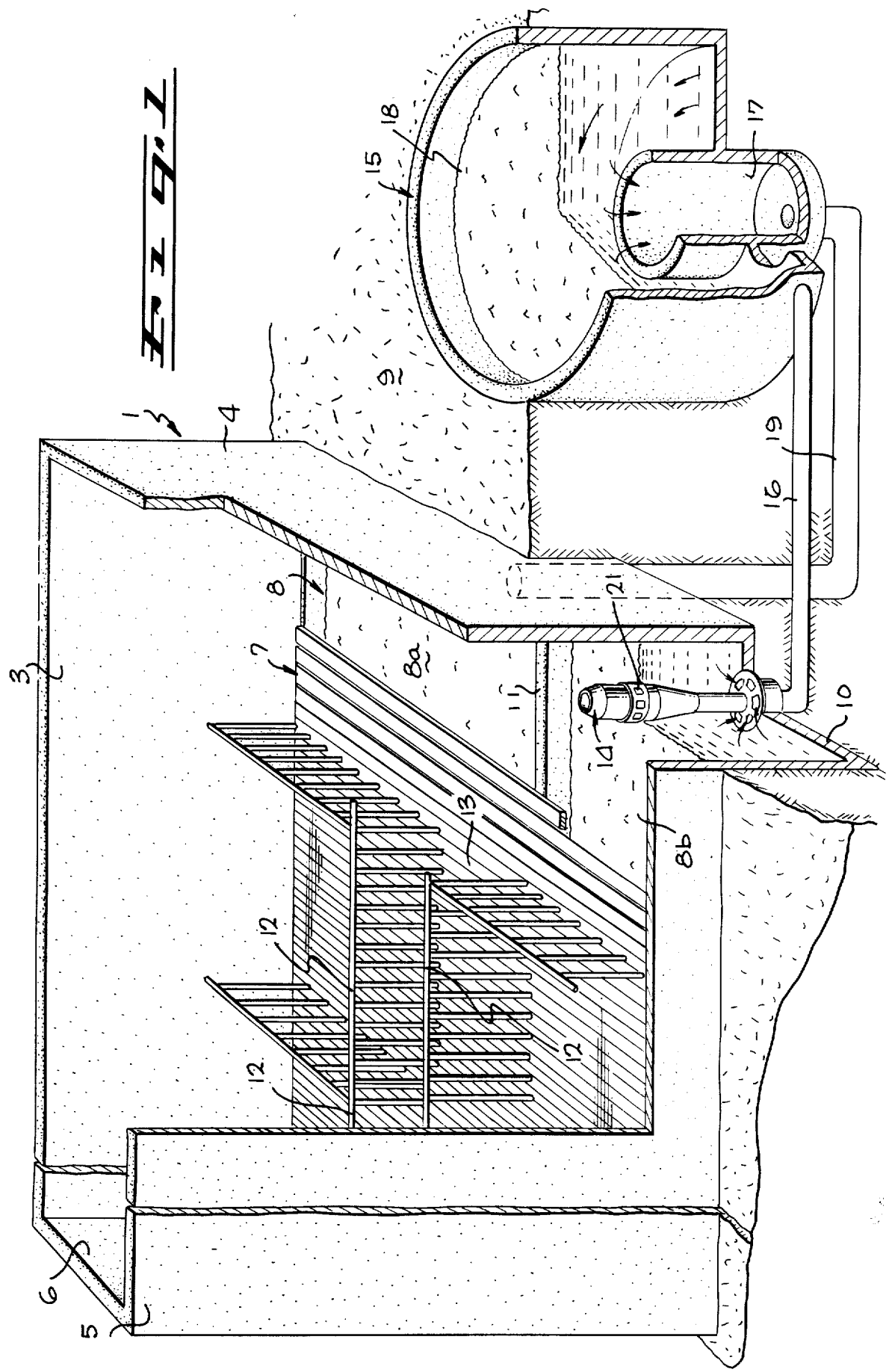

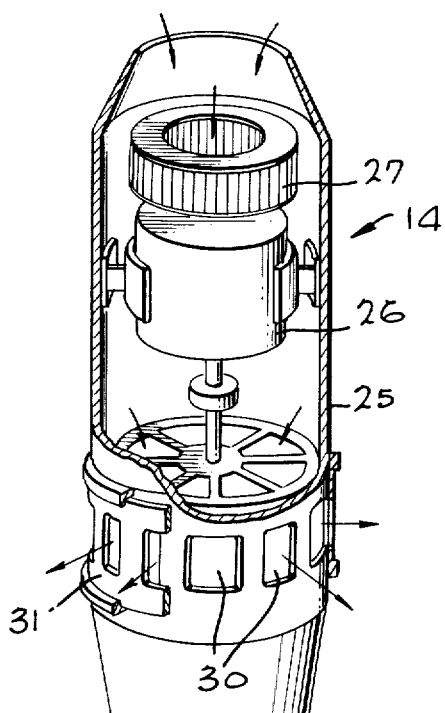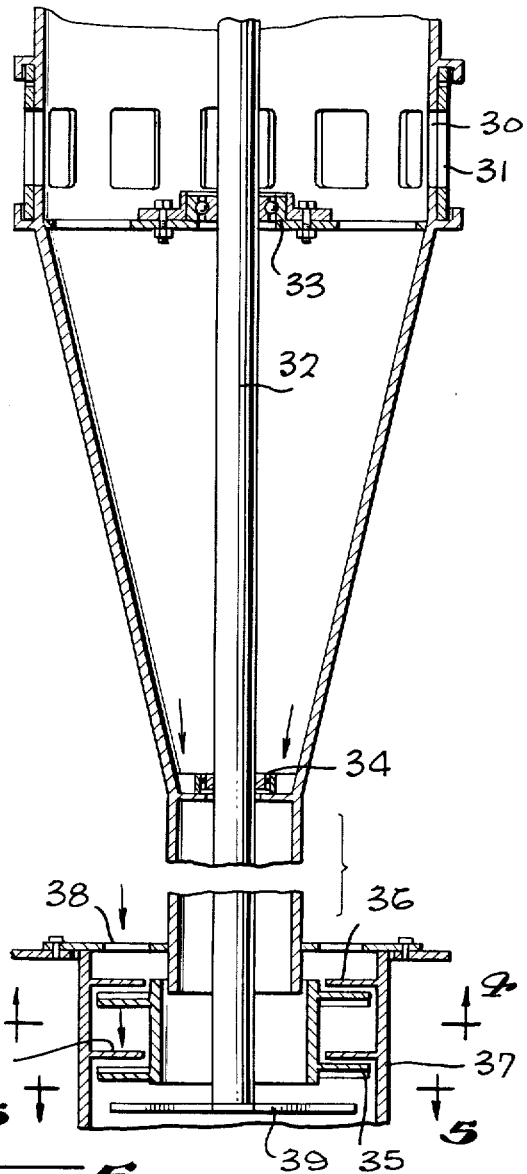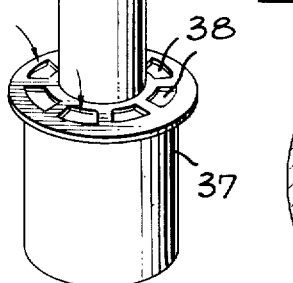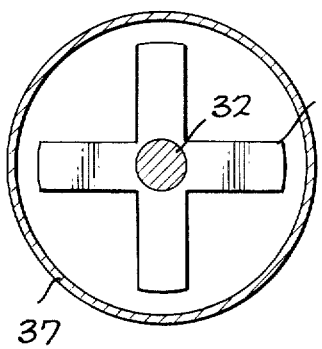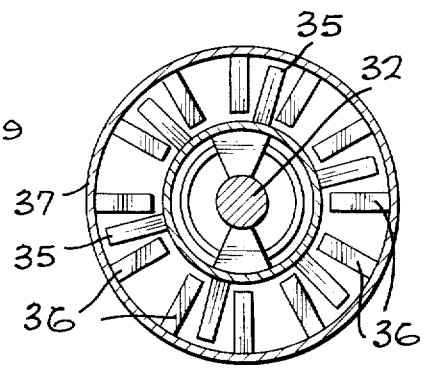

ANIMAL WASTE TREATMENT SYSTEM

This is a division of application Ser. No. 430,475, filed Jan. 3, 1974 now U.S. Pat. No. 3,927,644.

BACKGROUND OF THE INVENTION

The present invention relates generally to aerating and agitating pumps. Such pumps may, for example, comprise part of a waste treatment system for use in connection with an animal maintenance house of the type in which animal waste drops into a water filled ditch. A slurry of the water and waste is recirculated and aerated to encourage the growth of aerobic bacteria which reduces the waste to mainly carbon dioxide and water thereby minimizing the odor associated with the raising of animals such as swine.

Pumps such as for use in waste treatment systems should be capable of combining air with agitation so that slurry in a waste treatment system can be both aerated and agitated for recirculation within the system. Such pumps should desirably have a provision for adjusting the amount of air introduced under pressure to cause aeration and should be capable of pumping the slurry in a downward direction upon aeration and agitation. Such pumps should alos employ an arrangement such as rotatable and stationary blades to provide agitation of the incoming slurry and mixture thereof with air.

SUMMARY OF THE INVENTION

An aerating and agitating pump in accordance with the invention is ideally suited for use with a farm animal waste treatment system in which; an animal maintenance house is provided having a slatted floor upon which the animals are supported and beneath which is provided a ditch containing a slurry for the removal and treatment of the animal waste. An outlet conduit from the ditch is connected to a trap for receiving the slurry from the ditch and a return sump below the level of the slurry in the trap is connected to a return conduit to the ditch. The pump which performs the dual functions of aeration and agitation draws the slurry from the ditch and pumps it into the trap. The pump has an adjustable air vent so that optimum levels of aeration may be established for the proper oxidation of the animal wastes while minimizing those conditions which would otherwise lead to the production of foam. By means of the return sump below the level of the slurry in the trap any foam which is formed remains on the surface of the slurry in the trap and is not returned to the ditch, thereby eliminating the buildup of foam in the ditch. Also any noxious gases released by the agitating process are carried to the trap by the slurry and released to the air outside of the building. At the same time the sump in the trap is centrally disposed so that by virtue of a certain amount of centrifuge action during the movement of the fluid through the trap sediment concentrates in the bottom of the trap on a continuous basis. Accordingly, from time to time the sediment concentration in the trap may be pumped out as necessary without requiring the draining of the system. A better understanding of the advantages and features of the present invention may be had from a reading of the following detailed description and an inspection of the drawings.

BRIEF DESCRIPTION OF THE DRAWINGS

FIG. 1 is a perspective view of a waste treatment system and an asociated animal maintenance house having an aerating and agitating pump; in accordance with the present invention and in which the structure has been broken away to better illustrate the component parts thereof;

FIG. 2 is a perspective view of the aerating and agitating pump of FIG. 1 in which the structure has been broken away to illustrate the relationship of the component parts thereof;

FIG. 3 is a half-sectional view of the lower portion of the pump of FIG. 2;

FIG. 4 is a sectional view taken along line 4—4 of FIG. 3; and

FIG. 5 is a sectional view taken along line 5—5 of FIG. 3.

DETAILED DESCRIPTION OF A PREFERRED EMBODIMENT OF THE INVENTION

An animal maintenance shelter of FIG. 1 is designated generally by the numeral 1 and comprises a structure of walls 3, 4, 5 and 6 within which there is supported an open floor 7 comprising individual slats in conventional fashion for supporting the animals within the building while providing openings through which the waste from the animals drops by gravity with the occasional aid of water flushing into a ditch 8 which is divided into two portions 8a and 8b along the length of the building 1.

Preferably the building 1 is constructed partially below the level of the ground 9 as shown with the ditch having a concrete floor 10 and a divider 11 running along the length thereof to separate the portions 8a and 8b from each other except at the lefthand end. Individual pens 12 may be constructed on the slatted floor 7 for the maintenance of one or more animals. A walkway 13 is provided along the length of the building for access, entrance and egress of the animals.

At one end of the ditch 8b is installed a pump 14 in accordance with the invention whose function it is to withdraw from the ditch 8 a slurry comprising the water with which the ditch was originally filled along with the animal waste. The pump 14 performs the functions of moving the slurry, introducing air into the slurry and agitating the slurry upon removal from the ditch 8. The outlet of the pump 14 is connected to a cylindrical trap 15 via a pipe 16. The effluent from the pipe 16 enters the cylindrical trap 15 at its bottom tangentially so that the fluid within the trap 15 tends to have a counterclockwise motion as shown. Centrally disposed in the bottom of the trap 15 is a sump 17, the top of which is substantially below the level of the slurry 18. At the bottom of the sump 17 is an outlet from the trap 15 which is connected to the portion of the ditch 8a via a pipe 19.

In operation, when the pump 14 is functioning the slurry is recirculated in the ditch by withdrawing fluid from the portion of the ditch 8b into the trap 15 where sediment is continuously accumulated on the bottom outside of the sump 17. Although a certain amount of the sediment may be returned to the ditch 8a the process is continuous and very little buildup of sediment in the ditch 8 will take place since substantially all residual solid material will eventually have accumulated in the trap 15. Moreover, due to the motion of the slurry imparted by th position of the pipe 16 tangentially of the inside of the trap 15 and the natural vortex action taking place above the sump 17 a certain amount of centrifugal separation takes place which further enhances the continuous separation of the solid sediment from the slurry within the tank 15. As a result, it has proved to be unnecessary to drain the system for periodic cleaning and removal of the sediment as is required in conventional systems. Rather, it is only necessary to insert the imput line of an auxiliary pump into the trap 15 and to withdraw the accumulated solid wastes.

The pump 14 which will be described in detail below includes an adjustable air vent 21 whereby the amount of air introduced in the aerating action may be adjusted to achieve an optimum level of oxidation of the accumulated wastes. As is well known, the oxidation of the slurry in connection with the formation of aerobic bacteria breaks down the animal waste products to provide a substantially odor free waste treatment system releasing carbon dioxide and water by organic decomposition. However, in prior known systems utilizing conventional aerating devices, a serious problem arises due to the formation of foam on the surface of the slurry within the ditch 8. In extreme cases the slurry may produce enough foam to rise through the slatted floor 7 until it harms and sometimes suffocates the animals in the pens 12. The pump 14 in cooperation with the particular structure of the trap 15 precludes this possibility in the waste treatment inasmuch as the return of the fluid to the ditch 8 is taken from substantially below the surface 18 of the slurry, thereby causing the foam from the aeration process to collect on the surface 18 of the slurry in the trap 15. The foam 23 is confined in the top of the trap 15 and does not appear on the surface of the slurry 18 in the ditch 8, thereby completely overcoming the serious and damaging problem of foam buildup within the animal maintenance house.

The pump 14 which is shown in detail in FIGS. 2-5 comprises a housing 25 which at the upper portion thereof contains an electric motor 26. The upper shaft on the electric motor 26 drives a conventional centrifugal fan 27 which draws air into the top of the pump 14 through the opening as shown. The air flows through the fan 14 traveling downwardly along the sides of the motor to cool it and into the lower portion of the pump housing 25. Immediately below the motor 26 a plurality of vents 30 are cut in the housing 25 surrounded by an adjustable apertured ring 31 which may be turned about the body 25 of the pump 14 to open and close the apertures 30. By this means, the air from the fan 27 may be completely directed to the bottom of the pump 14 or, in the alternative, it may be partially vented to the atmosphere in order to provide the desired amount of aeration of the slurry. The tapered bottom portion of the housing 25 encloses the lower motor shaft 32 which is conventionally journaled in th ball bearings 33 and 34 (FIG. 5). The lower motor shaft 32 drives a plurality of blades 35 which turn with the shaft and interact with fixed vanes 36 mounted on the periphery of the cylindrical agitator housing 37. Further, the shaft drives the blade 39 at its bottom end. In operation, the slurry from the ditch is drawn into the openings 38 at the top of the agitator housing 37 where the slurry is agitated and mixed with the air as the blades 35 and 39 turn. Thus, the fluid forced out of the bottom of the pump has been agitated and aerated. The pump 14 may be installed at the inlet to the pipe 16 at the bottom of the ditch 8b for operation in the system described above in connection with FIG. 1. Electrical connections to the motor 26 must be provided which are suitably shielded from the environment in which the pump operates. The fan 27 and the motor 26 may be purchased as readily available items with the remainder of the structure being fabricated using conventional machine shop techniques and in accordance with this description and FIGS. 2-5.

From the above description of a preferred embodiment of the invention, it is apparent that there is provided a new and improved aerating and agitating pump which combines a variable amount of pressurized air with mechanical agitation provided by stationary and rotatable blades. The pump may be designed so as to assume a generally vertical position in which air is taken in near the top thereof, slurry is taken in at a location further down the length thereof and the aerated and agitated slurry is thereafter pumped in a downward direction.

Although a particular arrangement and system for the practice of the invention has been shown and described in detail it will be appreciated that the system may be modified and alternative arrangements employed within the scope of the invention as defined in the annexed claims.

What is claimed is:

1. An aeration pump for use in a waste treatment system in which a slurry of animal waste and water is pumped and aerated, including the combination of a motor, a centrifugal fan driven by the motor, first and second pluralities of blades driven by the motor, a housing having a hollow interior in air receiving proximity to the centrifugal fan, a plurality of adjustable vents communicating with the hollow interior of the housing for venting a selected portion of air received by the hollow interior of the housing from the centrifugal fan to establish a desired level of aeration of the slurry, the bottom portion of the housing having a fluid inlet above the blades for directing the slurry into the first plurality of blades to pump the slurry, means for directing air from the hollow interior of the housing into the region of the second plurality of blades to aerate the slurry and a fluid outlet below the blades whereby the slurry is driven through the pump and aerated to a degree providing optimum bacterial action with a minimum foam production.

2. An aerating pump comprising the combination of:
means for receiving a substance to be pumped and aerated;
first rotatable means for pumping the received substance along a path;
means disposed within said path downstream of the first rotatable means for introducing air into the substance; and
second rotatable means disposed within said path adjacent said means for introducing air for mixing the air and the substance;
said means for receiving a substance including a housing having a hollow interior defining said path and the first rotatable means and the means for introducing air together comprising a hollow element rotatably mounted within the hollow interior and having an open end through which air is introduced into the substance and a plurality of blades mounted on the outside of the hollow element upstream of the open end.

3. The invention defined in claim 2, wherein the second rotatable means comprises a blade mounted for rotation at the open end of the hollow element.

4. The invention defined in claim 2, wherein the housing has a plurality of vanes mounted on an inner wall thereof adjacent the first rotatable means.

5. An aerating pump comprising the combination of:

a hollow, generally cylindrical housing disposed generally vertically and having an upper end having at least one opening therein for receiving a substance to be pumped and aerated and an opposite lower end having at least one opening therein for discharging pumped and aerated substance;

a hollow, generally cylindrical element mounted within the housing for rotation about a generally vertically disposed central axis thereof;

means for rotating the element;

at least one blade mounted on the outside of the element at a first location thereon;

at least one blade mounted on the outside of the element at a second location thereon displaced from the first location along the central axis of the element, the blades being operative to pump substance received in the at least one opening in the upper end of the housing in a downward direction between the inside of the housing and the outside of the element in response to rotation of the element;

means for supplying air to the inside of the element;

mixing means mounted for rotation about an axis at a lower open end of the element and operative to mix air from inside the element with the substance pumped by the blades in response to rotation of the mixing means; and means for rotating the mixing means;

said means for rotating the element and the means for rotating the mixing means together comprising a shaft rotatably mounted within the housing and the element, means for rotating the shaft, means coupling the element to the shaft for rotation therewith and means mounting the mixing means on a lower end of the shaft.

* * * * *